United States Patent [19]

Urkowitz

[11] Patent Number: 5,376,939
[45] Date of Patent: Dec. 27, 1994

[54] DUAL-FREQUENCY, COMPLEMENTARY-SEQUENCE PULSE RADAR

[75] Inventor: Harry Urkowitz, Philadelphia, Pa.

[73] Assignee: Martin Marietta Corporation, Moorestown, N.J.

[21] Appl. No.: 79,725

[22] Filed: Jun. 21, 1993

[51] Int. Cl.$^5$ .................... G01S 13/28; G01S 13/42
[52] U.S. Cl. .................... 342/134; 342/162; 342/203; 342/136
[58] Field of Search ............ 342/134, 131, 111, 196, 342/136, 140, 162, 195, 145, 146, 116, 189, 201, 202, 203

[56] References Cited

U.S. PATENT DOCUMENTS

| | | | |
|---|---|---|---|
| 3,032,757 | 12/1962 | Marjerus et al. | 342/99 |
| 3,173,138 | 12/1965 | Erst | 342/119 |
| 3,427,617 | 2/1969 | Richman | 342/201 |
| 3,680,090 | 7/1972 | Bishop | 342/45 |
| 4,153,900 | 5/1979 | Novak et al. | 342/201 |
| 4,156,876 | 5/1979 | Debusser | 342/201 X |
| 4,176,351 | 11/1979 | DeVita et al. | 342/145 X |
| 4,236,140 | 11/1980 | Aker et al. | 342/115 |
| 4,353,067 | 10/1982 | Mims | 342/201 |
| 4,827,263 | 5/1989 | Jones et al. | 342/59 |
| 4,894,660 | 1/1990 | Thompson et al. | 342/129 |
| 4,937,583 | 6/1990 | Poinsard | 342/196 X |
| 4,960,329 | 10/1990 | Schofield | 356/5 |
| 5,047,784 | 9/1991 | Gerlach et al. | 342/201 |
| 5,070,337 | 12/1991 | Chen et al. | 342/201 |
| 5,103,233 | 4/1992 | Gallagher et al. | 342/408 |
| 5,151,702 | 9/1992 | Urkowitz | 342/134 |
| 5,157,403 | 10/1992 | Urkowitz | 342/111 |
| 5,229,775 | 9/1993 | Sakamoto et al. | 342/196 X |
| 5,245,347 | 9/1993 | Bonta et al. | 342/196 X |

Primary Examiner—John B. Sotomayor
Attorney, Agent, or Firm—W. H. Meise; C. A. Nieves; S. A. Young

[57] ABSTRACT

A radar system simultaneously transmits first and second signals toward a target at higher and lower carrier frequencies, respectively. Each carrier is phase-modulated by a set of pulses. The first set of pulses is dispersed in time, and the second set of pulses is mutually complementary thereto. The transmitted pulses are reflected by the target and received simultaneously. The received signals are processed separately by Doppler filtering. Each Doppler-filtered return is code-matched filtered, and the filtered signals in each Doppler channel are summed with the corresponding Doppler-and-code-matched-filtered signals originating from the other transmitted frequency, to form range signals. Each range signal has its main lobe enhanced and its sidelobes suppressed by the summing of the code-matched-filtered mutually complementary echoes.

8 Claims, 7 Drawing Sheets

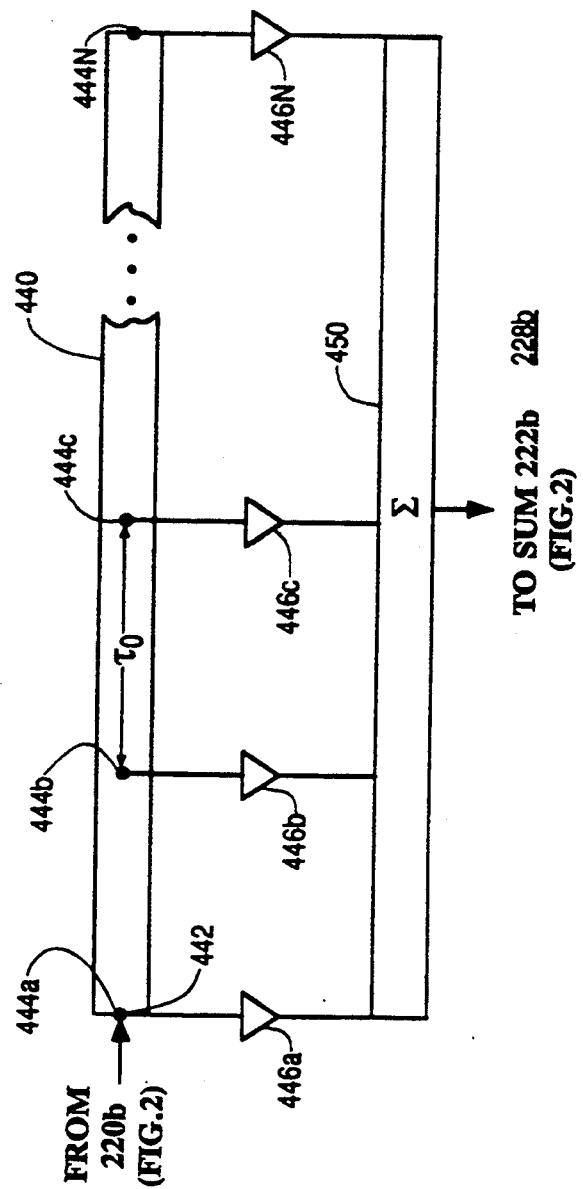

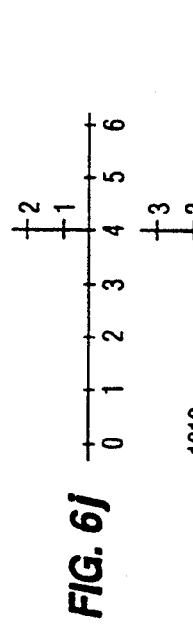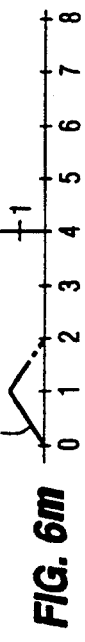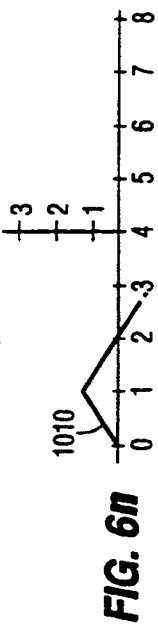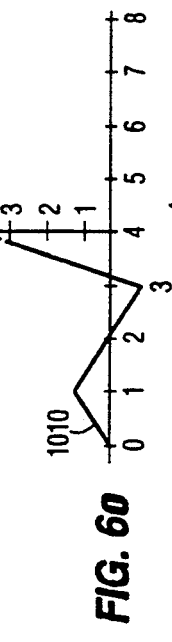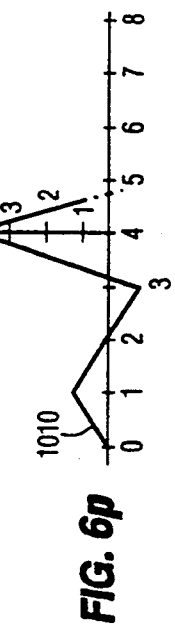
FIG. 6j
FIG. 6k
FIG. 6m
FIG. 6n
FIG. 6o
FIG. 6p
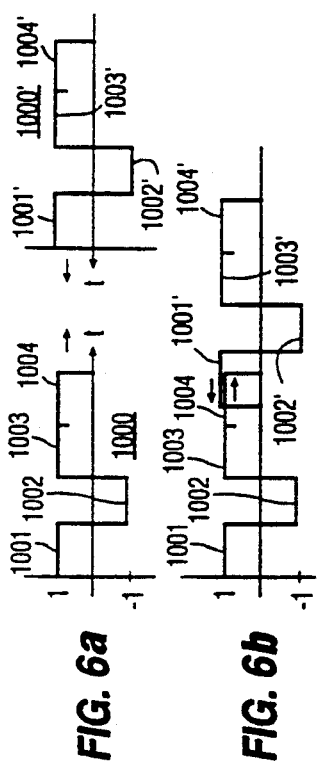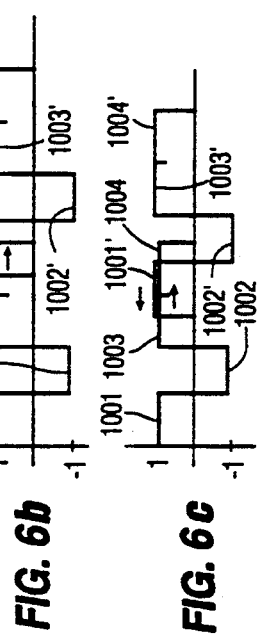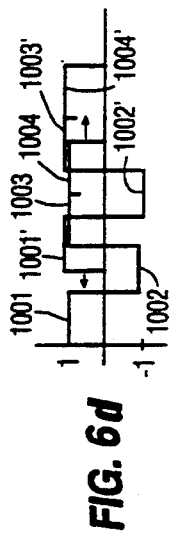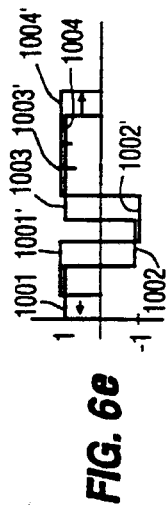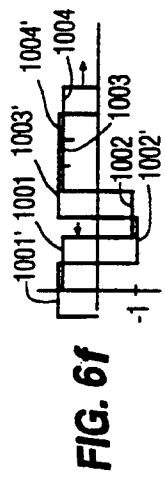
FIG. 6a
FIG. 6b
FIG. 6c
FIG. 6d
FIG. 6e
FIG. 6f

DUAL-FREQUENCY, COMPLEMENTARY-SEQUENCE PULSE RADAR

This invention relates to radar systems generally, and more specifically to arrangements for reducing range sidelobes in dual-frequency radar systems using Doppler processing of received echoes, pulse compression and summing.

BACKGROUND OF THE INVENTION

The high speed and long range of modern airborne vehicles places increasing range demands on radar systems used for tracking. The long-range requirement also requires the use of relatively high transmitted power to reliably detect small targets. High transmitted power implies a relatively higher peak transmitter power or a longer duration transmitter pulse (also known as a "wider" pulse). Assuming a maximum available peak power, longer range implies a longer duration transmitted pulse. A longer duration pulse tends to reduce range resolution, which is the ability to distinguish among targets which are at similar ranges. Pulse compression techniques can be used to improve range resolution in spite of the longer pulse duration, thus eliminating the need for high peak power short pulses, but in a monostatic radar, in which antenna and portions of the RF section are used both in transmission and reception, the minimum range at which a target can be detected increases with the transmitted pulse length. Thus, if the transmitter pulse duration is 100 microseconds ($\mu$s), the minimum distance at which a target may be detected is about 8 nautical miles (nm). Clearly, a monostatic radar using pulses of such a duration cannot be used to detect close-in targets, as for example aircraft which are landing or taking off from an airport at which the radar is situated. An additional problem associated with pulse compression is the appearance of range sidelobes (as distinguished from antenna sidelobes) in addition to the main range lobe. The time position, or range, of the main lobe is the position that is tested for the presence of a target and for estimating the parameters of that target (reflected energy or power, closing speed, fluctuations in echo power and closing speed, etc.). The presence of range sidelobes on the compressed pulse results in interfering echoes which originate at ranges other than the range of the main lobe. This interference, known as "flooding," can cause erroneous estimates of the echo characteristics in the range cell (i.e., range increment) covered by the main lobe. Prior art techniques for suppressing range sidelobes include the "zero-Doppler" technique, in which the range sidelobe suppression scheme is based in part upon the assumption that the interfering echoes, as well as the desired echo, have a closing velocity that has no significant Doppler phase change or shift over the duration of the uncompressed pulse. The Doppler phase shift $\phi_{DV}$ across the uncompressed pulse is $2\pi$ times the product of the Doppler frequency shift and the uncompressed pulse duration (i.e. $\phi_{DV}=2\pi\, f_d T_0$ radians). When this Doppler phase shift is actually zero or very small, moderate sidelobe suppression is achievable with the zero Doppler design. However, the zero Doppler design is very sensitive to small Doppler frequency shifts, making deep sidelobe suppression impossible for radar applications in which very deep sidelobe suppression is desired, as for example in weather mapping, clear air turbulence detection, and microburst detection.

U.S. Pat. No. 5,173,706, issued Dec. 22, 1992 in the name of Urkowitz, describes a pulse radar system in which Doppler processing is used to separate returns into frequency bins representative of radial speed. Interference from scatterers at other ranges is reduced by range sidelobe suppression filtering applied to the signal in each frequency bin.

U.S. Pat. No. 5,151,702, issued Sep. 29, 1992 in the name of Urkowitz, hereby incorporated by reference, describes a scheme for reducing range sidelobes by modulating sequentially transmitted radar pulses with first and second phase codes, which are selected so that, after separate pulse compression and matched filtering, the resulting compressed pulses each include main lobes which represent the range of the target, and also include range sidelobes which may introduce range ambiguity which range lobes are of mutually opposite sign. The compressed pulses are brought into time alignment and summed, whereby the main range lobes add and the range sidelobes cancel. The resulting range signal is then further processed for display.

The rapidity of modern transport systems requires radar systems with relatively rapid response times. For example, U.S. Pat. No. 5,103,233, issued Apr. 7, 1992 in the name of Gallagher et al., describes a radar system in which great attention is given to rapid operation in order to reduce the interval between scans of particular regions in an air traffic control context. The Gallagher et al. patent also describes a scheme for improving range resolution in the presence of clutter for detection of weather phenomena, separately claimed in U.S. Pat. No. 5,173,706, issued Dec. 22, 1992 in the name of Urkowitz. The improvement or range resolution in the presence of clutter is also important in other contexts, for example the detection and tracking of incoming missiles having very small radar cross-sections, in the presence of clutter such as sea action. In such a context, range of detection may be among the most important characteristics, because of the very short time which the speeds of such missiles allow for countermeasures. Improved methods and apparatus for reducing range sidelobes are desirable.

SUMMARY OF THE INVENTION

In a radar or other sensing system, first and second pulse sets are transmitted simultaneously at disparate frequencies. The first set of pulses is dispersed in time pursuant to a first phase code, called "phase code A" or "code sequence A", and the second set of pulses is dispersed in time pursuant to a second phase code, called "phase code B" or "code sequence B", which is complementary to the first. The echoes from the target are received simultaneously to form received first and second pulse sets, which may be at intermediate frequency or at baseband. The IF or baseband echoes are processed by separation into frequency bins, ordinarily referred to as Doppler filtering. Thus, the first and second received pulse sets are individually separated by Doppler frequency, and also by incremental time of receipt, which corresponds to range. Within each Doppler frequency band, the received first pulse set is filtered by a first-code-matched filter, which is matched to code sequence A, and the second pulse set is filtered by a second-code-matched filter, which is matched to code sequence B. The matched-filtered received first and second pulse sets have range sidelobes which are of mutually opposite polarity. The matched-filtered received first and second pulse sets are advantageously generated simultaneously, and they are summed together, whereby the range main lobes add and the range sidelobes cancel.

In a particular embodiment of the invention, the Doppler-filtered returned pulses are received simultaneously. First and second code-matched filters simultaneously filter the pulse sequences, whereupon the first set is summed with the second set. This has the advantage that range sidelobe suppression occurs with the first echo returns, and eliminates the inter-pulse delay period.

DESCRIPTION OF THE DRAWINGS

FIG. 4 is a simplified block diagram of a transversal filter;

FIG. 7b illustrates the autocorrelation of the coded subpulse set of FIG. 7a;

DESCRIPTION OF THE INVENTION

Figure 1:
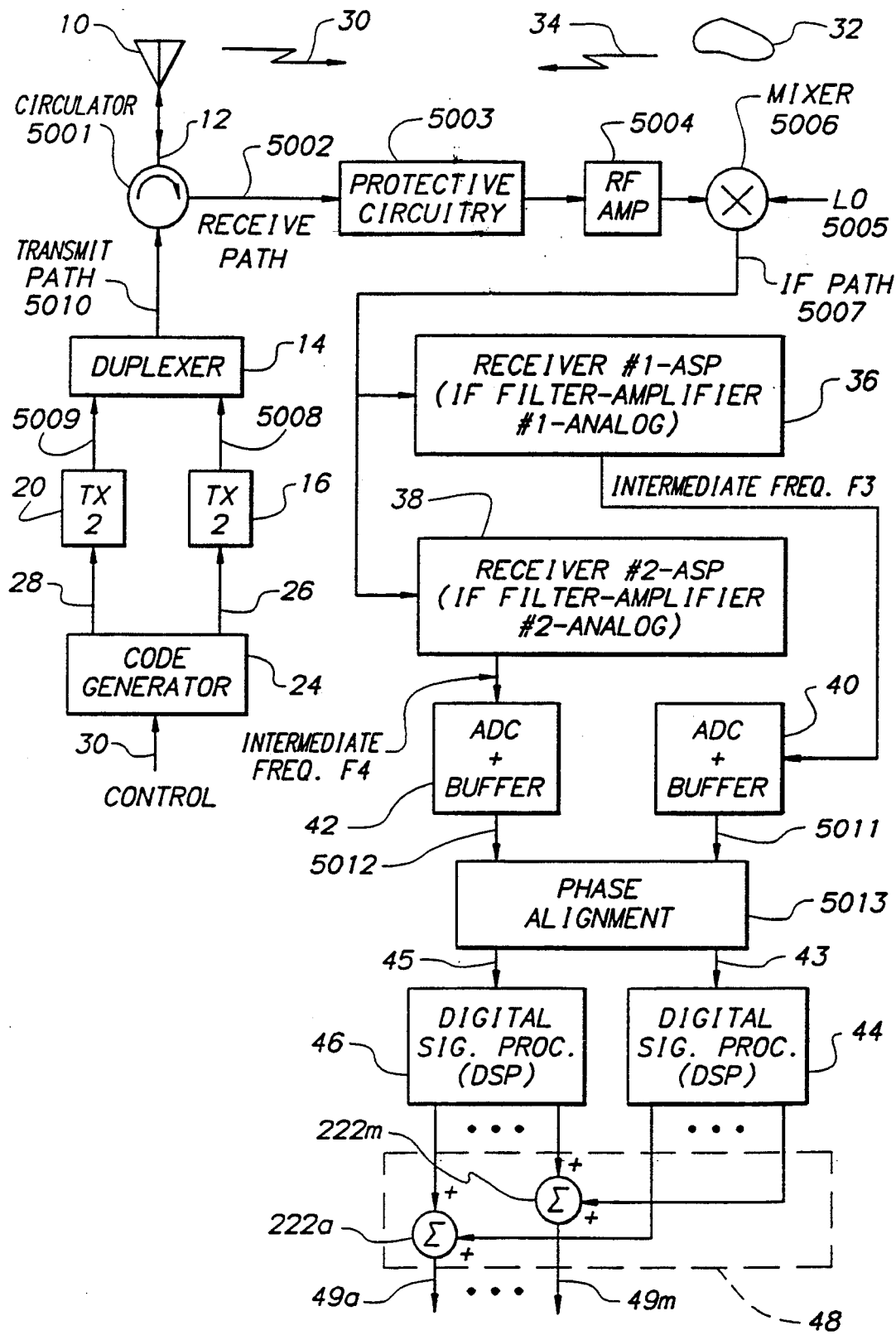
FIG. 1 is a simplified block diagram of a radar system according to the invention.

FIG. 1 is a simplified block diagram of a radar system according to the invention. In FIG. 1, a transmit-receive antenna 10 is coupled to the input-output port 12 of a circulator 5001 for separating input and output energy. A first controllable radio-frequency source, modulator or "transmitter" (TX 1) 16, operating at a first carrier frequency F1, is coupled, through a transmit path 5008, to a duplexer or combiner 14, as well known in the art. A second controllable radio-frequency electromagnetic signal source, modulator or "transmitter" (TX2) 20, operating at a second carrier frequency F2, is also coupled to duplexer 14, through a transmit path 5009. A pulse code generator 24 recurrently produces first and second pulses or sets of subpulses ("chips") under the control of timing signals applied over a control signal path 30 from a radar controller (not illustrated), and applies the pulses so produced over paths 26 and 28, respectively, to transmitters 16 and 20, respectively. In accordance with an aspect of the invention, the first and second sets of pulses are each dispersed in time, and are phase coded in a mutually complementary manner, so that, after pulse compression by code-matched filtering, described below, the main range lobes of the two compressed pulses are of the same sign or polarity, and the range sidelobes are of mutually opposite sign or polarity. The carrier signals produced by transmitters 16 and 20 are phase modulated by the first and second pulses (sets of subpulses), respectively, during recurrent transmitted pulse intervals Thus, each transmitted pulse is occupied by a set of subpulses or chips, and both pulses are simultaneously transmitted, each modulated by a mutually complementary subpulse or chip set.

Transmitters 16 and 20 are operated simultaneously at different carrier frequencies, with each overall carrier pulse phase-modulated by a set of subpulses or "chips", organized according to one of the complementary codes. The two transmitted pulses from transmitters 16 and 20 at their respective carrier frequencies are applied to the two inputs of duplexer 14. Duplexer 14 combines the signals for application through a circulator 5001 to antenna 10. Antenna 10 transmits the two signals simultaneously, as represented by arrow 30. A target, represented by 32, reflects a portion 34 of the energy back toward antenna 10. The velocity of propagation is the same for transmitted signals at both frequencies, so both signals arrive at the target simultaneously.

The coded signals at the two frequencies are reflected by the target to form echo signals, which return to antenna 10 and to the circulator 5001, which separates transmit and receive paths 5010 and 5002, respectively. The signal in receive path 5002 is applied to protective circuitry 5003, well known in the art, to protect subsequent circuits from the large signal that "leaks" through circulator 5001 into the receive path during transmission. The received signal is then applied to an RF amplifier 5004 to boost the signal to a level appropriate for input to mixer 5006. The combination of RF amplifier 5004, mixer 5006, and the local oscillator signal applied over path 5005 together provides low noise amplification, RF bandpass filtering, and downconversion to an intermediate frequency (IF) signal which appears on IF path 5007. When mixed or heterodyned with local oscillator (LO) signal applied over a path 5005, the resulting mixed intermediate frequency (IF) signal includes components resulting from echoes at both transmitted frequencies. The mixed intermediate frequency signal is applied through an IF path 5007 to a first receiver 36, and to a second receiver 38 for filtration as known in the art. The IF signal in path 5007 is sufficiently wide in frequency so that it covers the band of frequencies encompassed by receivers 36 and 38. Receivers 36 and 38 have the same bandwidths. Receiver 36 is centered at an intermediate frequency F3, and receiver 38 is centered at an intermediate frequency F4. Frequencies F3 and F4 are far enough apart so there is no significant overlap of the pass bands of the two receivers. Each receiver 36 and 38 is an analog filter-amplifier in the sense that each amplifies and passes a frequency band appropriate to the bandwidths of the two transmitted waveforms, with enough frequency separation to prevent significant frequency overlap.

The echo signals at the outputs of receiver 36 and of receiver 38 will be phase coded differently, in accordance with the first and second mutually complementary codes. Analog receivers 36 and 38 perform approximate matched filtering of the subpulses of the two phase coded waveforms, as is well known in the art. The passbands of the two analog receivers are shaped to approximate the frequency characteristics of the subpulses in each waveform.

The analog echo signals at the output of receiver 36 are applied to an analog-to-digital converter (ADC) 40, for conversion from analog form to digital form. ADC 40 may also include a buffer, if desired. Similarly, the output of receiver 38 is applied to ADC & buffer 42, in which the signals are processed for conversion to digital form. The conversion from analog to digital form may be accomplished in at least two ways, both well known in the art. One way uses direct conversion from an offset intermediate frequency to digital form. The other way uses a pair of product detectors comprising two mixers and two lowpass filters feeding into two baseband analog to digital converters to form the real and imaginary parts of the complex baseband signal. The digital signals produced by ADCs 40 and 42 are applied to a phase alignment block 5013 over paths 5011 and 5012. Phase alignment block 5013 brings the signals in the two receiver paths into phase alignment. The phase aligned digital signals are applied via paths 43 and 45 to digital signal processors (DSPs) 44 and 46, respectively, for processing by steps including the steps of filtering matched to the codes of first and second pulse sets, as described below, so as to form first and second compressed pulses in which the main range lobes are of the same sign or polarity, and in which the range sidelobes are of the same amplitude and of mutually opposite polarity. The compressed pulses produced by DSPs 44 and 46 are applied to the input ports (inputs) of a summing (Σ) circuit 48, which vectorially sums the compressed pulses, thereby canceling the range sidelobes, leaving the main range lobe.

Figure 5A:
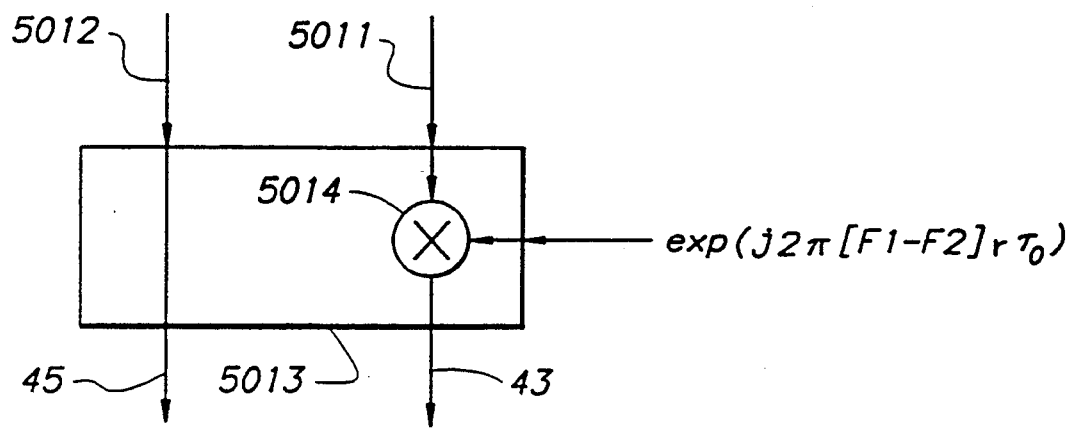
FIGS. 5a and 5b are simplified block diagrams of embodiments of a phase corrector which may be used in the arrangement of FIG. 1.
Figure 5B:
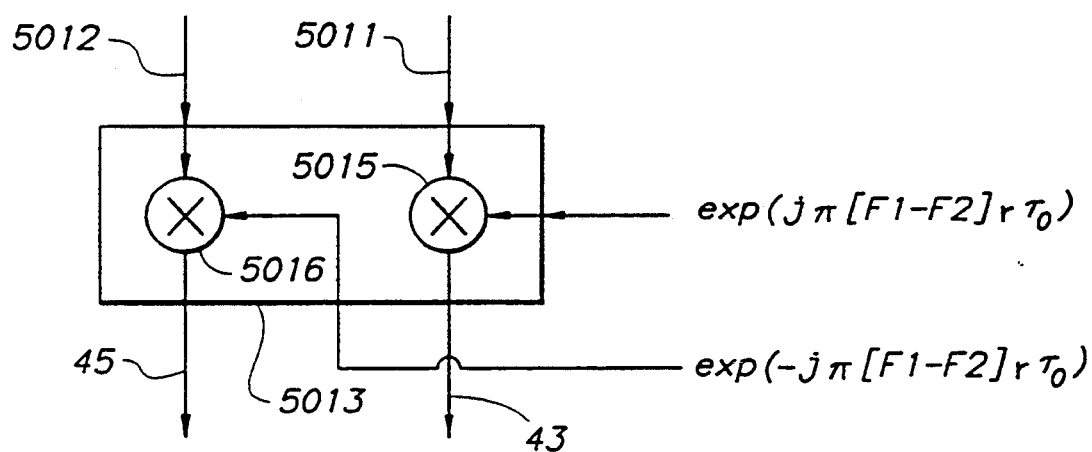

FIGS. 5a and 5b show alternative embodiments which may be used for producing phase alignment in block 5013 of FIG. 1. In FIGS. 5a and 5b, two input paths 5011 and 5012 carry signals at carrier frequencies F1 and F2, respectively. Therefore, for any given range delay $r\tau_o$, where $\tau_o$ is the range sampling period and r is an integer index, two signals will be misaligned in phase by an amount $$2\pi r\tau_o(F1-F2) \qquad (1)$$

A phase correction of this magnitude may be applied entirely to the signal in path 5011, as in FIG. 5a. Alternatively, the correction may be split between paths 5011 and 5012, as in FIG. 5b.

FIG. 5a shows a first embodiment in which phase alignment block 5013 contains two inputs 5011 and 5012, but only input 5011 is multiplied, via a complex digital multiplier 5014, by the correction signal $$\exp[2\pi r\tau_o(F1-F2)] \qquad (2)$$

which brings the two output signals on paths 43 and 45 into phase alignment. FIG. 5b shows a second embodiment, in which phase alignment block 5013 accepts signals over two input paths, 5011 and 5012, with both multiplied, respectively, via complex digital multipliers 5015 and 5016, by phase corrections:

$$\exp[j\pi(F1-F2)r\tau_o] \qquad (3)$$

for signal 5011, and $$\exp[-j\pi(F1-F2)r\tau_o] \qquad (4)$$

for signal 5012, which introduces equal and opposite phase corrections to bring the output signals on paths 43 and 45 into phase congruence.

The radar system of FIG. 1, by comparison with the arrangement of U.S. Pat. No. 5,151,702, reduces the time required to produce range information in the presence of clutter and may provide reduced sidelobes in those cases in which the target exhibits rapid changes in reflective characteristics, since both of the echoes used to produce the reduced range sidelobe compressed range pulse are reflected by the target simultaneously.

Figure 2:
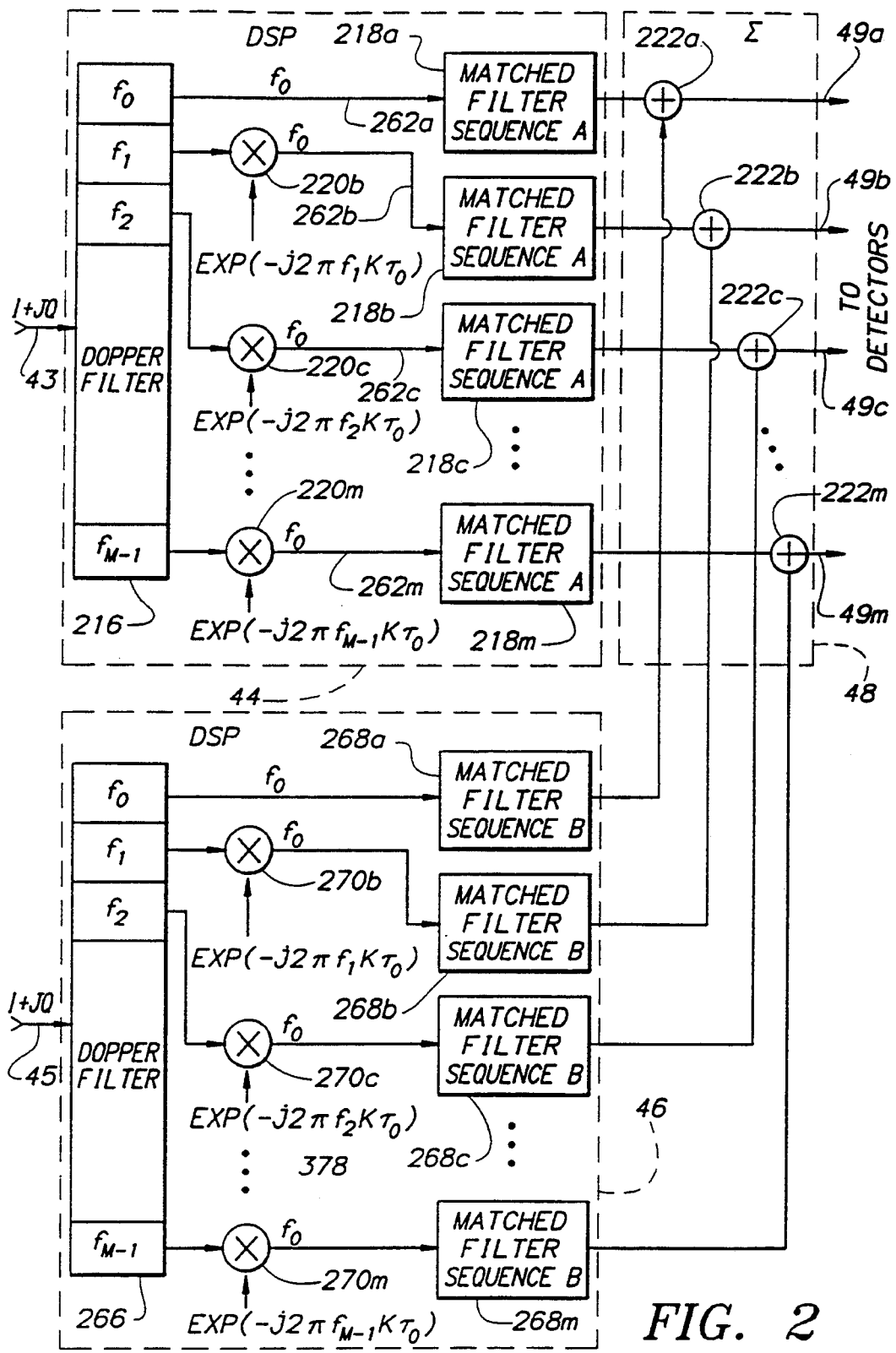
FIG. 2 is a simplified block diagram of a portion of the arrangement of FIG. 1.

FIG. 2 is a simplified block diagram of summer 48, and of digital signal processors 44 and 46 of FIG. 1. Elements of FIG. 2 corresponding to those of FIG. 1 are designated by like reference numerals. A digital signal comprising in-phase (I) and quadrature (Q) baseband components encoded with a first code sequence (A) is applied from ADC and buffer 40 of FIG. 1 over data path 43 to Doppler filter bank 216 of FIG. 2. Filter bank 216 includes a plurality of narrow-band Doppler filters, each of which responds to a particular narrow frequency band $f_0, f_1, f_2, \ldots, f_{M-1}$, thereby separate the incoming signal corresponding to phase code A into a plurality of frequency bins, the frequencies of which depend upon the Doppler frequency attributable to the radial velocity of the target. The frequency-separated signal in each frequency bin is also encoded with phase sequence A.

Similarly, a digital signal comprising inphase (I) and quadrature (Q) baseband components encoded with a second code sequence (B), which is complementary to code A, is applied from ADC and buffer 42 of FIG. 1 over data path 45 to Doppler filter bank 266 of FIG. 2, which is similar to Doppler filter bank 216. As in filter bank 216, Doppler filter bank 266 includes a plurality of narrowband Doppler filters. In Doppler filter bank 266, each filter responds to a particular frequency band $f_0, f'_1, f'_2, \ldots f'_{M-1}$, to thereby separate the incoming signal corresponding to the complementary B phase code, into a plurality of frequency bins, the frequencies of which depend upon the Doppler frequency attributable to the radial velocity of the target. The frequency separated signal in each frequency bin is encoded with phase sequence B. The Doppler frequencies $f'_1, f'_2, \ldots f'_{M-1}$ differ from the Doppler frequencies $f_1, f_2, \ldots f_{M-1}$ because, for the same radial target velocity, the Doppler frequencies are proportional to the two carrier frequencies. The relationships between Doppler frequencies $f_1, f_2, \ldots f_{M-1}$ and $f'_1, f'_2, \ldots f'_{M-1}$ for a set of radial velocities $v_1, v_2, \ldots v_{M-1}$ and for carrier frequencies F1 and F2, are $$f_i = \frac{2v_i}{c} F1, i = 0, 1, \ldots, M-1 \qquad (5)$$

$$f'_i = \frac{2v_i}{c} F2, i = 0, 1, \ldots, M-1$$

Thus $$f'_i = f_i(F2/F1), i = 0, 1, \ldots, M-1 \qquad (6)$$

For a stationary target, $v_o=0$, so that $f_o=f'_o=0$.

Figure 3:
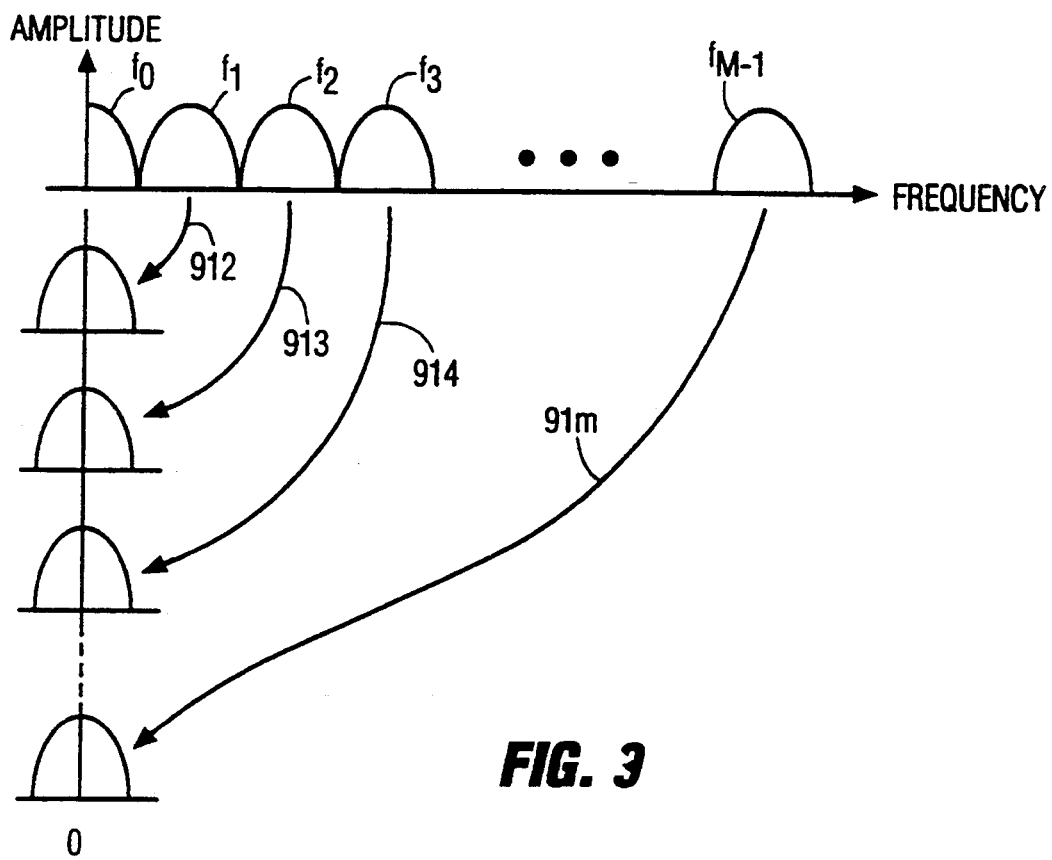
FIG. 3 represents amplitude-frequency spectra and a rearrangement thereof in the arrangement of FIG. 2.

FIG. 3 illustrates a zero frequency spectrum $f_0$ and additional spectra $f_1, f_2, f_3 \ldots f_{M-1}$, which together represent the output signals from filter bank 216 of FIG. 2. An echo having a given Doppler shift produces a substantial output from the output port of only one filter. For best velocity selectivity, the bandwidths of filter elements $f_0, f_1, f_2 \ldots f_{M-1}$ of filter bank 216 of FIG. 2 are narrow, in the range of a few Hertz or less. The bank of Doppler filters represented as block 216 may be implemented by a signal processor performing a discrete Fourier transform (DFT) by means of a fast Fourier transform (FFT) algorithm. The output of each filter is a range trace which is the sum of a sequence of Doppler filtered range traces. A particular filter output, therefore, represents target echoes having the particular Doppler frequency shift corresponding to its center frequency, and a small range of Doppler shifts about that center frequency, which depends upon the bandwidth of the filter.

In general, received signals encoded with code sequences A and B are separately applied to Doppler filters 216 and 266, respectively, of FIG. 2. The output of each Doppler filter of FIG. 2 is heterodyned, as described below, with the output of a complex digital oscillator, the frequency of which corresponds to the Doppler frequency of that filter. The oscillator wave is preferably a digital stream at the range sampling frequency. The heterodyning removes the Doppler phase shift along the range dimension. The result is a signal whose spectrum has been shifted to zero frequency. The resulting zero frequency wave then undergoes matched filtering (i.e., pulse compression) by a filter matched to the corresponding code sequence A or B to produce compressed output signals, and the compressed output signals are summed. The resulting sums are pulse compressed, range sidelobe suppressed, signals. The range sidelobe suppression occurs because, as described above, the range sidelobes are complementary (i.e., equal in magnitude but opposite in sign). Each resulting sum is ultimately coupled to a corresponding amplitude detector (not illustrated in FIG. 2) to generate signals which, when arrayed, can be sorted according to the velocity of the target by selecting the appropriate detector output. Thus, the presence of a target signal at the output of a Doppler filter indicates that the target has a particular radial velocity. Within each Doppler frequency bin, the target range is known from the time of arrival of the signal. Also, the signals produced by the detectors may be coupled to threshold circuits in further digital processing, to allow separation of significant returns from noise, and thence for further processing and display. The several outputs of the detectors form a "periodogram", which is an estimate of Doppler power density spectrum of the echo. Such an estimate is useful when the echo is produced by meteorological phenomena, and can be used to help in determining the presence of hazardous weather conditions. The circuits fed by the sums of the various pairs of Doppler filter elements $f_0, f'_0, f_1, f'_1, f_2, f'_2, \ldots ; f_{M-1}, f'_{M-1}$ of filter banks 216 and 266 may each be considered a "Doppler channel." Thus, filter element $f_0$ and the following circuits, namely matched filter 218a, constitute a Doppler channel relating to targets with a low radial velocity, while filter element $f_2$, multiplies 220b and matched filter 218b together constitute another Doppler channel relating to targets with a larger radial velocity, corresponding to $f_2$.

In FIG. 2, pulse compression is accomplished by performing matched filtering on each individual Doppler channel. The matched filter is matched to the pattern of phase changes associated with the dispersed pulse code A or B transmitted with carrier frequency F1 or F2, respectively. One A-code matched filter 218, which may also be termed a pulse compressor, is associated with each Doppler filter element $f_0, f_1, f_2, \ldots f_{M-1}$ of Doppler filter bank 216. One B-code matched filter 268 is associated with each Doppler filter element $f'_0, f'_1, f'_2, \ldots f'_{M-1}$ of Doppler filter bank 266. It would be possible to make each pulse compressor with different filtering parameters to optimize pulse compression for the center frequency of the associated Doppler filter element. This would improves the overall performance, because the range of frequencies at the output of each filter is small, on the order of a few Hertz. This may represent a small percentage of the center frequency of the filter. Thus, each pulse compressor may be optimized at one frequency, and its performance will not be excessively degraded by the small phase shifts attributable to a range of frequencies which is a small percentage of the optimized frequency. To avoid the need for different filter parameters in each of the pulse compressors so that identical compressors may be used with each Doppler filter bank for cost reasons, the filtered output signal from each filter element of filter banks 216 and 266 (except the lowest-frequency filter element $f_0, f'_0$) is converted to a common frequency range. A suitable range is the zero frequency range of filter element $f_0$, which may for example be the range extending from zero Hertz to a few Hertz.

The same heterodyning principles apply to the outputs of both Doppler filter banks 216 and 266, the heterodyne processing of the output of Doppler filter bank 216 is described in detail. In FIG. 2, the output from filter element $f_0$ of filter bank 216 is applied directly to a pulse compressor 218a, because the output frequency range of filter element $f_0$ is already at zero frequency, and therefore no frequency conversion is necessary. The outputs from all the other filter elements $f_1, f_2, \ldots , f_{M-1}$ are individually applied to multipliers 220 for converting each filter output to zero frequency. For example, filter element $f_1$ of filter bank 216 has its output connected to a first input port of a multiplier 220b. Multiplier 220b has a second input port coupled to an oscillation source (not illustrated in FIG. 2) of signal $$\exp(-j2\pi f_1 k\tau_0), k=0, 1, \ldots \quad (7)$$

where $f_1$ is the center frequency of the corresponding filter element of filter bank 216, $\tau_0$ is the range sampling period, and k is the integer time index.

The oscillator frequency is thus the negative (i.e., same absolute frequency but 180° out-of-phase) of the center Doppler frequency at which the corresponding filter element of filter bank 216 of FIG. 2 is centered. For example, the oscillator signal $\exp(-j2\pi f_2 k\tau_0)$ applied to multiplier 220c has a frequency that is the negative of frequency $f_2$ at which filter element $f_2$ of filter bank 216 is centered. Essentially, the output signals of the individual elements $f_1, f_2, \ldots, f_{M-1}$ of Doppler filter bank 216 are heterodyned by multipliers 220 to be centered at zero frequency, whereupon identical zero frequency pulse compression filters 218 may be used in each Doppler channel. For example, pulse compressor 218a is coupled to filter element $f_0$, and provides zero frequency A-code matched filtering; pulse compressor 218b is coupled to the output of multiplier 220b for receiving therefrom filtered signals originally at $f_1$ but downconverted to zero frequency, and performs A-code matched filtering in the zero frequency signal. The process of downconversion is illustrated generally in FIG. 3, in which filtered signals at frequencies $f_1 \ldots f_{M-1}$ are converted to zero frequency by the multiplying processes represented by arrows 912, 913, 914, ... 91m. Each of the other pulse compressors 218c ... 218m of FIG. 2 also receives signals downconverted to zero frequency. Thus, all A-code matched pulse compressors 218 are mutually identical. Similarly, all B-code matched pulse compressors 268a, 268b, 268c, ... 268m associated with the output of Doppler filter bank 266 are mutually identical.

The A-code filtered output signals from pulse compressors 218a ... 218m of FIG. 2 are applied to a multiplicity of adders 222a, 222b, ..., 222m. Each adder 222a, 222b, ... 222m of FIG. 2 has as its other input the downconverted, B-coded pulse compressed output of the corresponding Doppler channel of Doppler filter bank 266.

As mentioned above, Doppler filter bank 266 is similar to Doppler filter bank 216 in that it is a bank of filters, but the specific Doppler frequencies at which these filters are centered differ slightly from those of filter bank 216 as described below, because a given target closing speed results in different Doppler frequencies resulting from the two carrier frequencies F1 and F2.

In Doppler filter bank 266, the center frequencies to which the filters are tuned are:

$$f'_0(\text{same as } f_0), f'_1, f'_2, \ldots, f'_{M-1} \quad (8)$$

The following relationship exists between $f_k$ and $f'_k$ $$f'_k = (F3/F1)f_k, \quad k=0, 1, 2, \ldots, M-1 \quad (9)$$

In FIG. 2, the $f_0$ output from filter element $f'_0$ of filter bank 266 is applied directly to a pulse compressor (i.e., a filter matched to biphase code sequence B that is complementary to the biphase code sequence A) because the output of filter element $f'_0$ is already at zero frequency and therefore no frequency conversion is necessary. The outputs from all the other filter elements $f'_1, f'_2, \ldots, f'_{M-1}$ are individually coupled to multipliers 270 for converting each filter output to zero frequency. For example, filter element $f'_1$ of filter bank 266 has its output connected to a first input port of a multiplier 270b. Multiplier 270b has a second input port coupled to an oscillation source (not illustrated in FIG. 2) of signal $$\exp(-j2\pi f'_1 k\tau_0), \quad r=0, 1, 2, \ldots \quad (10)$$

where
$f'_{2'}$ is the center frequency of the corresponding filter element of filter bank 266,
$\tau_0$ is the range sampling period
k is the integer time index all as described above in conjunction with filter bank 216, so that identical zero frequency pulse compression filters 268 (matched to code sequence B) may be used in each Doppler channel. For example, pulse compressor (i.e., B-code matched filter) 268a is coupled to filter element $f'_0$ (which is the same frequency as $f_0$), and provides zero frequency matched filtering; B-code matched pulse compressor 268b is coupled to the output of multiplier 270b for receiving therefrom filtered signals originally at $f'_1$ but downconverted to zero frequency, and performs matched filtering (i.e., pulse compression) in the zero frequency signal, all as described above in conjunction with FIG. 3, but in which $f_1, f_2, \ldots, f_{M-1}$ are replaced, respectively, by $f'_1, f'_2, \ldots f'_{M-1}$. Each of the other pulse compressors 218c, ..., 218m also receives signals downconverted to zero frequency. The output signals from pulse compressors 268a, ..., 268m are applied to the other input ports of adders 222a, ..., 222m for summing with the corresponding A-code pulse compressed signals. The set of resulting summed signals goes to detectors and/or further processing as mentioned above.

The two inputs to each of the adders 222a, 222b, 222c, ... 222m are mutually complementary compressed signals from, respectively, Doppler filtered first and second code sets, code set A and code set B. The compressed codes A and B have main lobes which are the same, as described below which therefore add, but have range sidelobes of equal but mutually opposite polarities, which cancel when summed. The signals on output paths 49a, ..., 49m, are therefore almost completely free of range sidelobes.

A pulse compressor follows each of the complex multipliers in FIG. 2. Since each complex multiplication removes the residual Doppler phase shift across the uncompressed pulse, no residual Doppler phase shift remains on the uncompressed pulse. Each pulse compressor is a zero Doppler design. All of the pulse compressors are therefore identical for each of the Doppler filter banks in FIG. 2. FIG. 4 illustrates a tapped delay line or transversal filter of the type known as a "finite impulse response" (FIR) filter, because a change in the input causes a change in the output which extends over a finite time. The FIR filter of FIG. 4 may be used as a matched filter (pulse compressor) 218 or 268 component in the arrangement of FIG. 2. For definiteness, the structure of FIG. 4 represents a zero Doppler matched filter 218 of FIG. 2. As illustrated, matched filter 218b of FIG. 4 includes a delay structure 440 which receives signal at its input port 442 and causes the signal to propagate to the right, past taps illustrated as nodes 444a, 444b ... 444n. The temporal spacing (delay) between adjacent taps equals range sampling period $\tau_0$. The delay structure, if in digital form, may be a shift register. Each node 444 is coupled to a tap weight multiplier illustrated by a triangular symbol 446a, 446b ... 446n. The weighted, delayed signals from multipliers 446 are applied to a combinatorial summer ($\Sigma$) 450 for producing the desired matched filtered (pulse compressed) signals, which are applied to the corresponding summer 222 of FIG. 2.

Figure 6G:
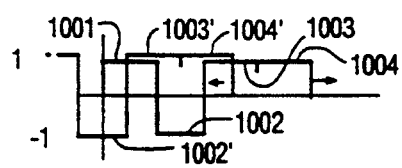
FIGS. 6a–6s, collectively referred to as FIG. 6, are amplitude-time representations useful in explaining autocorrelation of the coded subpulses of a pulse set.

In order to perform the invention, transmitters 16 and 20 of FIG. 1 must cause each transmitted pulse (each sequence of phase-modulated subpulses or chips) to be matched or accompanied by a corresponding simultaneously transmitted pulse in which the phase sequence of the subpulses is complementary to the first phase sequence. For this purpose, the term complementary means that the sum of the time autocorrelation functions of the two pulse sets or sequences ideally has no sidelobes outside of the main lobe. Waveform 1000 of FIG. 6a represents a pulse formed from four subpulses or chips 1001, 1002, 1003 and 1004, having amplitudes of 1, −1, 1, 1, respectively, which may be viewed as unit vectors with relative phases of 0, $\pi$, 0, 0, respectively. FIGS. 6a-6i (where the hyphen represents the word "through") represent steps in forming an autocorrelation function, and FIGS. 6j-6s represent the result of the autocorrelation. As is well understood by those skilled in the art, autocorrelation "scans" the time function across a corresponding time function "moving" in the negative time direction, multiplying together the "overlapping" portions and summing the products. For example, an autocorrelation is performed on waveform 1000 of FIG. 6a by allowing it to stand still (or move to the right), while causing a similar waveform 1000', including subpulses 1001', 1002', 1003' and 1004' to move to the left, as indicated by the direction arrows in FIG. 6a. In FIG. 6a, waveforms 1000 and 1000' do not overlap, so their product is zero, and no output signal is produced, as illustrated in FIG. 6j. While the amplitudes of the positive and negative excursions of both pulses 1000 and 1000' are unity, pulse 1000' is illustrated as slightly larger than pulse 1000 to allow them to be visually distinguished. In FIG. 6b, corresponding to time interval 0-1 (where one time interval corresponds to the duration of a subpulse or chip), subpulses 1004 and 1001' overlap, both are positive so their product is positive, and the overlap region is increasing in area, so the resulting autocorrelation 1010 is a positive-going ramp increasing from zero amplitude, as illustrated between times 0 and 1 in FIG. 6k.

At the end of time interval 0 to 1, the overlap of subpulses 1004 and 1001' is complete, and ramp 1010 of FIG. 6k reaches a maximum value of 1. Immediately thereafter, negative subpulse 1002' begins to overlap positive subpulse 1004, while positive subpulse 1001' moves to the left, to overlap portions of subpulse 1003, as illustrated in FIG. 6c. The product of subpulse 1001' multiplied by portions of subpulses 1004 and 1003 remains constant in the time interval 1-2, while the product of negative subpulse 1002' multiplied by portions of positive subpulse 1004 increases in magnitude, with a negative sign. The sum of these products in the time interval 1 to 2 is a negative-going ramp portion of waveform 1010, as illustrated in FIG. 6m. At time 2, positive subpulse 1001' overlaps positive subpulse 1003 for a product of +1, and negative subpulse 1002' overlaps positive subpulse 1004, for a product of −1, the net of which is zero, as illustrated by plot 1010 in FIG. 6n at time 2. In the time interval 2 to 3, the summed product continues to ramp toward a value of −1, as illustrated in FIG. 6n.

In the time interval 3 to 4, waveforms 1000 and 1000' move toward congruence, as illustrated in FIG. 6e. The main autocorrelation lobe peaks during congruence of identical waveforms. At time 4, congruence is reached, with positive subpulse pairs 1001, 1001'; 1003, 1003' and 1004, 1004', and negative subpulse 1002, 1002' overlapping for a total magnitude of 4, as illustrated in FIG. 6p.

Figure 6Q:
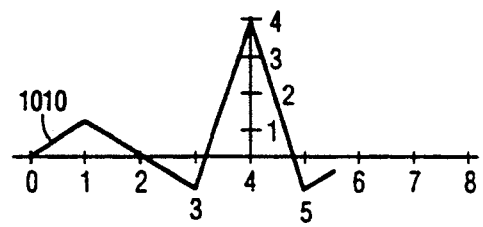
Figure 6H:
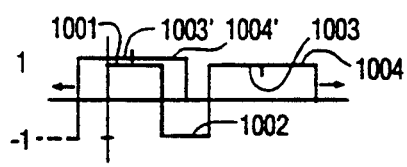
Figure 6R:
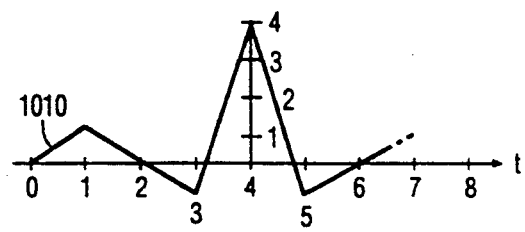
Figure 6I:
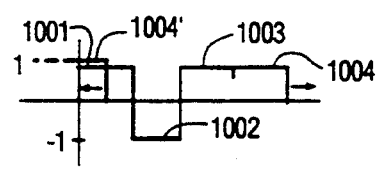
Figure 6S:
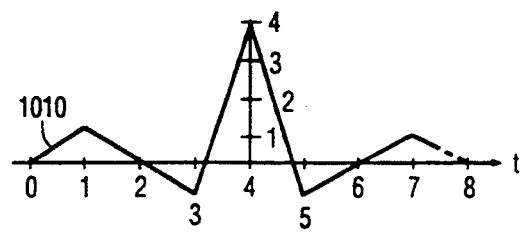

Following time 4 represented in FIG. 6p, waveforms 1000 and 1000' move away from congruence, as illustrated in FIG. 6f. The negative subpulses, 1002 and 1002' have significant overlaps with positive subpulses, and the overlap of positive subpulses 1001' and 1004 with their counterparts is progressively reduced in the time interval 4-5, resulting in a sharp drop of the autocorrelation toward a value of −1, as illustrated in FIG. 6q near time 5. From the above description, the mode of generation of autocorrelation waveform 1010 in the time interval 5-8, illustrated in FIGS. 6r and 6s, will be apparent, based upon the subpulse overlaps illustrated in FIGS. 6h and 6i.

Figure 7A:
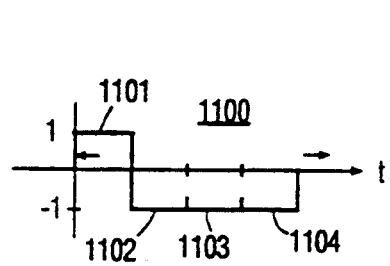
FIG. 7a illustrates another coded subpulse set.
Figure 7B:
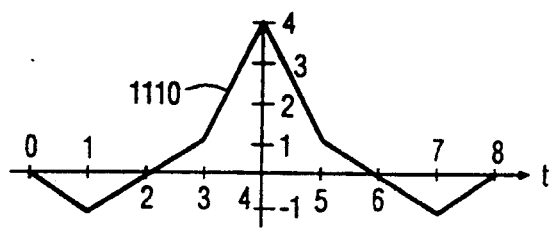

FIG. 7a illustrates another subpulse 1100, which has positive unit value during the first of four clock cycles, and negative value for the three following clock cycles. Plot 1110 of FIG. 7b illustrates the autocorrelation of subpulse 1100 of FIG. 7a. comparison of the waveform of FIG. 7a with the waveform of FIG. 6s reveals that, while their main lobes each have positive amplitude at center time 4, the sidelobes are of equal magnitude and opposite polarity.

Figure 8:
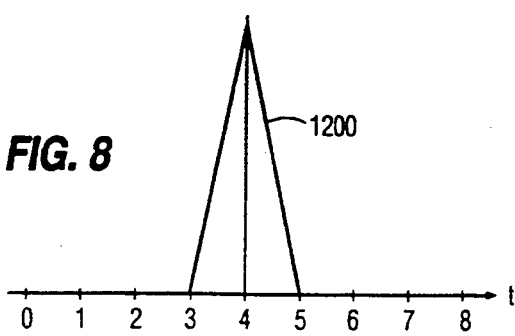
FIG. 8 represents the summation of the autocorrelation of FIGS. 6 and 7.

When waveforms 1010 and 1110 are summed in the adders 222 of summer 48 of FIG. 2, the sidelobes in the intervals 0-3 and 5-8 cancel, leaving only the main lobe in the interval 3-5, as illustrated by waveform 1200 of FIG. 8. Waveform 1200 is the desired range lobe, with sidelobes cancelled by use of complementary pulse sequences.

As described above, the range sidelobes tend to cancel. If the input Doppler shift is not exactly equal to the center frequency of a Doppler filter element of filter bank 216, the range sidelobes may not cancel exactly, but the deterioration in the cancellation will not exceed that caused by a frequency shift equal to half the bandwidth of a filter element. Normally, this equals half the frequency spacing between adjacent filters of the filter bank.

Other embodiments of the invention will be apparent to those skilled in the art. For example, while a radar context is described in which electromagnetic radiation is directed toward a target, acoustic waves in a fluid medium could as easily be used, as in a sonar system, or other anomaly detector. While binary phase sequences have been described, other phase variations, such as continuous analog phase variations, may be used, so long as appropriate processing is used, and the autocorrelation functions have the desired property of low range sidelobes.

What is claimed is:

1. A method for determining the range of targets, comprising the steps of:
   simultaneously transmitting toward said target first and second carriers at first and second disparate frequencies, said first carrier being modulated by a first pulse set consisting of a predetermined plurality of first pulses, said pulses of said first set being dispersed in time pursuant to a predetermined first code, and said second carrier being modulated by a second pulse set consisting of said predetermined plurality of second pulses, said pulses of said second set being dispersed in time pursuant to a predetermined second code selected to be complementary to said first code in a manner such that, after pulse compression of said first and second pulse sets, the resulting range sidelobes are substantially equal in amplitude and opposite in sign;
   receiving echoes of said first and second pulses reflected from said target to produce received first and second pulse sets;
   matched-filtering at least one frequency component of said received first and second pulse sets to produce contemporaneous first and second compressed pulses; and
   summing said first and second compressed pulses.

2. A method according to claim 1, wherein said transmitting step includes the step of transmitting electromagnetic energy.

3. A method according to claim 1, further comprising the step of:
   separately Doppler filtering said received first and second pulse sets into a plurality of said frequency components to produce a sequence of range values for each frequency component, each of said sequence of range values including one of said first and second code sequences.

4. A method according to claim 3 wherein said step of separately Doppler filtering said received first and second pulse sets is performed simultaneously upon said first and second pulse sets.

5. A method according to claim 1, comprising the further steps of
   following said receiving step, converting said received first and second pulse sets into digital form; and phase aligning said digital form of said first and second pulse sets before said step of matched-filtering.

6. A system for transmitting signals toward a target for echo ranging, said system comprising:
   first transmitting means for transmitting toward said target a carrier signal at a first frequency modulated by a first pulse set consisting of a predetermined plurality of first pulses, said pulses of said first set being dispersed in time pursuant to a predetermined phase code;
   second transmitting means for transmitting toward said target a second carrier signal at a second frequency, different from said first frequency, said second carrier signal being modulated by a second pulse set consisting of said predetermined plurality of second pulses, said pulses of said second set being dispersed in time pursuant to a second phase code selected to be complementary to said predetermined phase code in a manner such that, after pulse compression of said first and second pulses, the resulting range sidelobes are substantially equal in amplitude and opposite in sign;
   receiving means for receiving echoes of said first and second pulse from said target to produce received first and second pulse sets;
   matched-filtering means coupled to said receiving means for matched filtering each of said received first and second pulse sets to produce first and second compressed pulses;
   combining means coupled to said matched filtering means for combining said first and second compressed pulses to produce reduced-range-sidelobe signals.

7. A system according to claim 6, further comprising analog-to-digital conversion means coupled to said receiving means for converting said received first and second pulse sets to digital received first and second pulse sets.

8. A system according to claim 7, further comprising phase alignment means coupled to said analog-to-digital conversion means for phase aligning said digital received first and second pulse sets.

* * * * *